United States Patent [19]

Huber et al.

[11] Patent Number: 4,737,374

[45] Date of Patent: Apr. 12, 1988

[54] SOFT-SERVE FROZEN YOGURT MIXES

[76] Inventors: Clayton S. Huber, 189 East 4380 South, Provo, Utah 84604; David M. Rowley, 266 North 300 East #16, Provo, Utah 84601

[21] Appl. No.: 46,922

[22] Filed: May 7, 1987

[51] Int. Cl.[4] .................... A23G 9/00; A23G 9/02; A23C 9/123

[52] U.S. Cl. ..................... 426/565; 426/583

[58] Field of Search .............. 426/565, 583, 100, 101, 426/61, 41, 43

[56] References Cited

U.S. PATENT DOCUMENTS

| | | | |
|---|---|---|---|
| 4,110,476 | 8/1978 | Rhodes | 426/583 |
| 4,178,390 | 12/1979 | Igoe | 426/583 |
| 4,289,789 | 9/1981 | Cajigas | 426/583 |
| 4,293,573 | 10/1981 | Bradley, Jr. et al. | 426/583 |
| 4,427,701 | 1/1984 | Morley | 426/583 |
| 4,590,077 | 5/1986 | Trop | 426/583 |
| 4,624,853 | 11/1986 | Rudin | 426/583 |

*Primary Examiner*—Jeanette Hunter
*Attorney, Agent, or Firm*—Thorpe, North & Western

[57] ABSTRACT

A smooth textured soft frozen non-fat yogurt having a solids content between about 18 to 43% w. and an overrun of between about 35 to 65% is prepared by dissolving in cold water and freezing, in a soft serve freezer, a dry particulate composition comprising (a) about 0.5 to 2.0% w. of a stabilizing mixture consisting of 40-60% w. carrageenan, 20-40% w. of second stabilizer selected from the group consisting of xanthan gum, guar gum, locust bean gum, sodium alginate, gelatin, gum tragacanth, India gum, agar-agar and pectin and mixtures thereof and 20-30% w. CMC; (b) 3-14% w. of a dried yogurt powder, (c) 1.5-40% w. of added milk solids selected from the group consisting of non-fat dry milk solids, whey solids and whey protein concentrate; (d) 43-94% w. of a sweetening agent; (e) 0.03 to 10% w. of a flavoring agent; (f) 0.0 to 1.5% w. of an acidifying agent; and (g) 0.0 to 0.5% w. of the sodium salt of an acidifying agent. Xanthan gum, guar gum and locust bean gum and mixtures thereof are preferable as the second stabilizers. Sucrose, fructose and corn syrup solids admixed with maltodextrins are the preferred sweetening agents. The composition may vary according to neutral (e.g. vanilla, coconut, banana, etc.), chocolate (chocolate mint, chocolate mocha, etc.), and acidic fruit (e.g. peach, apricot, strawberry, lemon, etc.) flavor formulations.

36 Claims, No Drawings

SOFT-SERVE FROZEN YOGURT MIXES

BACKGROUND OF THE INVENTION

This invention relates to soft serve frozen yogurt desserts. More particularly, this invention relates to flavored yogurt dessert mix powders for preparing soft frozen non-fat yogurt desserts having small crystal size, smooth consistency and uniformity of texture.

Soft frozen desserts ranging from dairy products such as ice milk, custard, ice cream and yogurt to non-dairy water ice items such as slushes, shave ices and Sno-Kones# are becoming more readily available through fast food and convenience outlets. Dairy frozen desserts are of more limited availability due to the fact that dairy containing products are more strictly regulated than their non-dairy counterparts. Moreover, many soft frozen dairy desserts such as yogurt have not attained the same popularity as other frozen dairy desserts due to the fact that they must be prepared and shipped as liquids in non-frozen form.

Non-fat frozen yogurt is defined as a frozen dairy product made from milk, with or without added milk solids, flavoring, or seasoning, which has been pasteurized and afterwards fermented by one or more strains of *Lactobacillus bulgaricus*, including yogurt strain, *Streptococcus thermophilus* and *Lactobacillus acidophilus*. The product may or may not be pasteurized following fermentation depending upon state regulations. Fruits and flavorings may be added before or after the mix is fermented and cultured. The product may contain harmless edible stabilizers or emulsifiers in stated amounts. Standards of titratable acidity, expressed as lactic acid, are set depending upon the flavoring and/or fruit content. The freezing and air incorporation of the frozen yogurt is set at not more than a stated percent by volume of the product, e.g. 60 percent.

There are no dry mix standards for the preparation of frozen yogurts. Therefore, the standards for mixes which are stated are for liquids. A typical standard (California Food and Agricultural Code Section 36994) pertains to frozen yogurt and lowfat frozen yogurt mixes only and contains no mention at all of mixes for non-fat frozen yogurt. That section states that frozen yogurt mix and lowfat yogurt mix are unfrozen products which are used in the manufacture of frozen yogurt and lowfat frozen yogurt. They are required to comply with all the requirements for frozen yogurt and lowfat frozen yogurt respectively.

Because of the current emphasis on limiting fat intake, there is considerable interest in non-fat desserts of all varieties. In the case of yogurt, it would be advantageous to have a non-fat dry yogurt mix from which a soft frozen product could be prepared by dissolving the mix in water and freezing.

OBJECTS AND BRIEF SUMMARY OF THE INVENTION

It is an object of the present invention to provide a powdered mix for the preparation of soft frozen non-fat yogurt desserts which can be dissolved in water, frozen and served from conventional soft serve freezers used for dairy products.

It is also an object of this invention to provide a dry, powdered yogurt mix which is homogeneous and readily soluble in cold water.

These and other objects may be accomplished by thoroughly dry blending ingredients to obtain a homogeneous mixture which, when rehydrated, will have a solids content of between about 18 to 43% weight, will be made up of 13 to 30% weight of one or more sweeteners, consisting of a mixture of a maltodextrin and one or more agents of high relative sweetness such as sucrose, fructose, corn syrup solids or aspartame, 1 to 4% weight of a spray dried yogurt powder, 0.5 to 12% weight of added milk solids other than yogurt powder, 0.2 to 0.6% weight of a specified stabilizer mixture made up of carrageenan, xanthan gum and/or guar gum and CMC, 0.01 to 3.0% weight of natural or artificial flavoring agents and, for some mixes, 0 to 0.5% weight of an acidifying agent and from 0 to 0.15% weight of a sodium salt thereof. The combined sweetening agent, yogurt powder, added milk solids, stabilizer mixture, flavoring agents and, if used, fruit acidifying agent and salt thereof must be sufficiently balanced to provide a mixture that will readily dissolve in cold water and, when frozen, will provide a stable soft frozen non-fat yogurt at an overrun of between about 35–65% at a draw temperature of between about 18° to 23° F.

The contents and ratios of contents will vary somewhat depending upon the flavor of frozen yogurt being prepared. These are broken into three categories, i.e. (1) neutral (flavors such as vanilla, coconut, banana, pralines and cream, etc.); (2) chocolate (chocolate, chocolate mint, chocolate mocha, etc.) and (3) acidic (peach, apricot, lemon, raspberry, strawberry, etc.).

An additional embodiment may be obtained by fortification of the mixture with additional protein. This may be accomplished by replacing from about 1 to 45% by weight of the maltodextrin portion of the sweetener agent with a soy protein isolate or whey protein concentrate.

DETAILED DESCRIPTION OF THE INVENTION

The homogeneity of the dry blend is critical to the formation of a smooth, creamy textured soft frozen yogurt. The stabilizers must be uniformly dispersed throughout the soft frozen yogurt to obtain the desired texture and product stability. Moreover, the combination of stabilizers is also critical to the obtaining of a smooth, stable, slow melting product.

The flavoring agents are matters of choice and may be artificial or natural. However, the choice of flavor will determine whether the mix will be prepared as an acidic, neutral or chocolate formulation. Each formulation will be discussed in detail.

Fat containing dairy frozen desserts have been preferred over their non-fat counterparts due, in part, to their smooth and creamy, as distinguished from course and grainy, texture. Smoothness is created primarily by the fat content of dairy products. The less fat in the product, the more granular is the texture. For example, Arbuckle, *Ice Cream* (3rd Edition) AVI Publishing Company, Inc., Westport, Conn. 1977, p. 278, states that, for soft frozen products, if the fat content is less than 4%, the product tends to be course, weak, and icy.

Stabilizers have been utilized in frozen dairy desserts to produce additional smoothness in body and texture, to retard or reduce ice crystal growth during storage, to provide uniformity of product and resistance to melting. Stabilizers function either through their ability to form gel structures in water or in their ability to combine with water, as water of hydration, and function as thickening agents. It is the ability of small percentages of certain stabilizer combinations to absorb and bind relatively large amounts of unbound water which produces good body, smooth texture and slow meltdown in the compositions of this invention. Usage rates in the present invention are in line with average stabilizer content in ice cream which ranges from about 0.2 to 0.60% weight. In some jurisdictions, the legal stabilizer limit is 0.5% weight. In most formulations described herein, this limit is acceptable.

Some stabilizers utilized for dairy products may not function as readily in powdered yogurt mixes. Most dairy products are conventionally prepared by first heating in order to bring all the ingredients into solution. Thus, the fact that some stabilizers may be of limited solubility in cold or ambient water is not important in making frozen dairy desserts in the conventional manner.

In the present invention, it is imperative that the stabilizer mixture be soluble in cold water, i.e. at 50° F. or lower. Also, it is essential that the stabilizer be uniformly dispersed in the dry mixture so that when added to cold water it will immediately be evenly distributed throughout the solution. The stabilizer found to be most useful in the present invention is a mixture having carageenan as a major component, a second stabilizer component selected from the group consisting of xanthan gum, guar gum, or locust bean gum and, as a third stabilizer component, CMC (sodium carboxymethylcellulose).

Carrageenan is a stabilizer extracted from the seaweed carrageen (Irish moss) and comprise about 40 to 60% by weight of the stabilizer mixture.

Of the second components, xanthan gum, guar gum, or combinations of xanthan gum and guar gum are preferred. Xanthan gum is a high-molecular weight (5-10 million) water-soluble natural gum and is a heteropolysaccharide made up of building blocks of D-glucose, D-mannose, and D-glucuronic acid residues. It is produced by pure culture fermentation of glucose with *Xanthomonas campestris* and is stable over a wide pH range. In addition, xanthan gum has similar viscosity in both hot and cold solutions. Guar gum is a complex carbohydrate obtained from a legume grown in India and is also stable over a wide pH range.

Soft frozen yogurts containing a carrageenan, xanthan gum, guar gum or combinations of xanthan gum and guar gum and CMC stabilizer mixture have a smooth creamy texture. Other stabilizers conventionally used in ice cream manufacture such as locust bean gum, sodium alginate, gelatin, gum tragacanth, India gum, agar-agar and pectin may also be used as second stabilizer components with some degree of success but are less preferable in that the product texture and meltdown are not as good as with the more preferred xanthan and guar gum stabilizer combinations. It is also within the scope of the invention to combine or blend together mixtures of the second stabilizer components and combine them with carrageenan and CMC.

Xanthan gum, locust bean gum, guar gum and CMC function as thickening agents where as carrageenan, agar-agar, alginates and pectin are gelling agents. While not wishing to be bound by any theory, it would appear that, with the possible exception of carageenan, thickening agents function as preferred stabilizers over gelling agents in providing the desired properties to soft frozen yogurts.

As previously stated, all stabilizer combinations, to be functional, must be freely soluble in cold water.

The stabilizer mixtures should be present in sufficient amounts that, when rehydrated, the stabilizer will amount to between about 0.2 and 0.6% w. and preferably between about 0.3 and 0.5% w. of the total composition.

As previously stated, the carrageenan will comprise about 40 to 60% by weight of the stabilizer package. The second stabilizer component will be present in amounts ranging from about 20 to 40% by weight and the CMC will also comprise between about 20 to 30% by weight. Most preferably, the ratio of carrageenan to second stabilizer and CMC will be about 2:1 and the ratio of second stabilizer to CMC will be about 1:1 for neutral and chocolate flavored formulations. For acidic fruit flavored formulations, the xanthan gum, guar gum and CMC components will preferably be utilized in approximately equal amounts. A stabilizer combination consisting of 40% by weight carrageenan, 20% by weight xanthan gum, 20% by weight guar gum and 20% by weight CMC has been found particularly useful for acidic formulations.

The term "frozen yogurt" has previously been defined as being made from milk, with or without added milk solids, flavoring, or seasoning, which has been pasteurized and afterwards fermented by one or more yogurt bacterial strains. In the present invention, only a portion of the milk solids have actually been fermented to provide the "yogurt" taste. The remaining milk solids are added to provide the additional qualities and solids content required of a suitable, smoothly textured frozen yogurt product.

Dried yogurt powder is obtained from skim milk which has been cultured with the usual yogurt bacteria, pasteurized, and then spray dried. Such products are commercially available under the tradename Beatreme 3315 or San-A NF Yogurt from Beatrice Foods Co., Beloit, Wisconsin. Non-fat yogurt powder is also available from Mid-America Farms, Inc. of Springfield, Mo. Sufficient yogurt powder is used in the mix to provide a solids content making up about 1 to 4% weight in the frozen yogurt product. The amount of yogurt powder in the acidic formulation will be higher than in the neutral and chocolate formulations to provide greater acidity. Normally, the neutral and chocolate formulations will contain between about 1-3% by weight whereas the acidic formulation will contain between about 2-4% by weight. The yogurt powder content of the acidic formulation will be roughly twice the content in the neutral and chocolate formulations.

In addition to dried yogurt powder, other milk solids are added to provide body, taste and texture. In the neutral and chocolate formulations, it is preferred to use whey solids and non-fat dry milk solids or mixtures thereof. These milk solids are higher in natural minerals than, for example, whey protein concentrate. However, in the acidic formulation, whey protein concentrate is the preferred source of milk solids because whey proteins are not as readily affected at acidic pH ranges as is casein. When using whey protein concentrate, it is often desirable to add a source of sodium, such as sodium citrate, as a buffering agent and also to balance the flavor. Some properties of the milk solids utilized are contained in the following paragraphs.

Non-fat dry milk is the product obtained by removal of water only from pasteurized skim milk. It contains not more than 5% by weight moisture, and not more than 1½% by weight milkfat.

Whey is defined as the liquid substance obtained by separating the coagulum from milk, cream, or skim milk in cheese making. Whey obtained from processes in which there is insignificant conversion of lactose to lactic acid is referred to as "sweet whey", which is the preferred form for use in the present invention. Dried whey is obtained by removing water from whey and contains a protein content of about 10 to 15%, a fat content of about 0.2 to 2.0%, a lactose content of about 61-75% and a moisture content of about 1-8%.

Whey protein concentrate is obtained by the removal of sufficient non-protein constituents from the whey that the dried product contains not less than 25% protein. In general, whey protein concentrates are available containing from 25 up to about 75% protein, from about 1 to 10% fat, not more than 60% lactose and from about 1 to 6% moisture.

The milk solids, other than that provided by the yogurt powder, will vary between about 0.5 to 12% by weight of the rehydrated and soft-frozen yogurt. However, when each type of formulation is taken into consideration, the milk solids contents of the acidic formulation are lower than in the neutral and chocolate formulations. The neutral and chocolate formulation preferably contain between about 4 and 12% by weight of whey solids or non-fat dry milk solids or a mixture of the two. When a mixture is used, both the whey solids and non-fat dry milk contents may vary between about 2 to 6% by weight. The ratio of non-fat milk solids to whey solids may vary from about 3:1 to 1:3. On the other hand, the milk solids content of the acidic formulation is preferably made up of the more acid stable whey protein concentrate and is present in amounts of between about 0.5 and 2% by weight.

The bulk of the solids content of the frozen yogurt is made up of the sweetening agent or agents.

While sucrose is the preferred sweetener, other sweetening agents may also be employed. In order to maintain an appropriate total solids content in the overall rehydrated composition of between about 18 and 43% by w., the sweetening agent should be present in amounts of between about 13 and 30% by w. This will also depend upon which type of formulation is being used. The chocolate type formulations and, also neutral and acid type formulations containing certain natural flavorings such as fruit powders, will normally contain less sweetening agent than will neutral and acid type formulations which are artificially flavored.

Since various sugars or sweetening agents have different relative sweetness (based on sucrose at a value of 100), the amount used to obtain the desired sweetness in the soft frozen yogurt products may vary. Hence, if fructose (relative sweetness of 173) is utilized, it may be preferable to combine the fructose with a corn syrup. High conversion corn syrup (62 DE) has a relative sweetness of 68 whereas low conversion corn syrup (32 DE) has a relative sweetness of 42. Replacing a portion of sucrose or other sugar with corn syrup solids will generally result in a smoother textured final product. Also, potent sweetening agents, both nutritive and non-nutritive, or high relative sweetness, such as aspartame, saccharin, acesulfame K, alitame, thaumatin, cyclamate, glycyrrhizin, stevioside, L-sugars, neohesperidin, and the like may be used if balanced with an appropriate amount of a carbohydrate having a low relative sweetness such as maltodextrins. Maltodextrins are also valuable in providing solids content and body building properties but have little affect on the freezing point. All of the above are categorized generally as sweetening agents. However, sucrose, fructose, maltodextrins and corn syrup solids are preferred sweetening agents. Most particularly preferred sweetening agents are combinations of sucrose or corn syrup solids and maltodextrins.

Since relative sweetness is determined subjectively, the amount and blend of sweetening agents is a matter of choice. What is important is that sufficient sweetening agent is to be used to provide the desired sweetness and solids content to the soft frozen yogurt product. Since sugars also affect the freezing point of the product, the amount and molecular weights of the sugars used are also to be taken into consideration.

For neutral formulations, it is generally desirable that the sweetening agent content of the rehydrated formulation be in the range of about 15-27% by weight. When using a combination of sucrose and maltrodextrins, their contents may vary about 8 to 14% by weight sucrose and 7 to 13% by weight maltodextrin. When using the less sweet corn syrup solids, the amounts will change somewhat with ranges of 10 to 20% by weight of corn syrup solids and 5 to 10% by weight maltodextrin being considered appropriate.

In chocolate formulations, the sweetening agent content preferably varies between about 13 and 23% by weight. When using a combination of sucrose and maltodextrins, their contents may vary between about 10 to 16% by weight sucrose and 3 to 7% by weight maltodextrin. When using the less sweet corn syrup solids, the amounts will change somewhat with ranges of 13 to 21% by weight of corn syrup solids and 0 to 5% by weight maltodextrin being considered appropriate.

In acidic fruit flavored formulations, the sweetening agent content is somewhat higher and generally varies between about 20 and 28% by weight. When using a combination of sucrose and maltodextrins, their contents may vary between about 10 to 16% by weight sucrose and 10 to 14% by weight maltodextrin. It will be noted that the sucrose content is about the same as for neutral and chocolate formulations. However, the maltodextrin content is considerably higher to provide body and texture to the product to make up for the lower milk solids content in acidic formulations. When using the less sweet corn syrup solids, the amounts will change somewhat with ranges of 13 to 23% by weight of corn syrup solids and 7 to 11% by weight maltodextrin being considered appropriate.

If desired, special formulations can be prepared using protein in the place of some of the maltodextrins. Maltodextrins are complex carbohydrates which contribute little to the sweetening of the yogurt product and are used primarily to provide body and texture. Protein powders from soy isolates or whey protein concentrate which have a protein content of from about 75 to 92% by wieght can replace about 1 to 40% by weight of the maltodextrins. Many health conscious consumers prefer protein supplements to carbohydrates. In view of this, protein fortified neutral, chocolate and acidic fruit flavored compositions are considered to be a distinct embodiment of the invention when replacing from 1 to 40% by weight of the maltodextrins. In other words, the weight ratio of protein supplement to maltodextrins will be between about 1:99 to 1:1.5.

The flavoring agents may be any natural or artificial flavor desired and may range from single fruit flavors such as peach, apricot, raspberry, lemon, strawberry, cherry, blueberry, pineapple, orange, vanilla, banana, coconut, chocolate, chocolate mint, chocolate mocha, etc. and blends thereof to more exotic or unusual flavors such as pralines and cream. Generally, these flavoring agents will be present in amounts of between about 0.01 to 3.0% w. in the overall rehydrated composition.

When natural flavoring agents such as chocolate or fruit powders are used, the amount of flavoring agent will tend to be in the upper range due to fibers and other natural ingredients. Preferably, the flavoring agents will be present in amounts of between about 0.01 and 1.0% for artificial flavors. For chocolate and natural fruit powders, the preferred range is between about 0.2 and 3.0% weight.

In acidic formulations such as fruit flavor selections, it is desired to enhance the acidity and tartness of the flavor. In such cases, from 0.1 up to about 0.5% w. of a fruit acid such as citric acid, malic acid or tartaric acid, may be added to the composition. In addition, a certain amount of the sodium salt of the acid, from about 0.01 to 0.15% by weight, can also be utilized for flavor balance and buffering.

It is also within the scope of the invention to fortify the composition with vitamins and/or minerals to provide an overall blend that will supply some or all of the U.S. RDA of selected vitamins and/or minerals on a per serving basis.

The various ingredients are placed in a suitable mixing apparatus such as a rotating gravity, paddle or helical ribbon mixer and dry blended until thoroughly and homogeneously mixed. The dispersion of the stabilizer with the yogurt powder, other milk solids, sweetening agent and flavoring is critical to the obtaining of a smooth textured product. The variations in densities of the ingredients making up the blended mixture are not so great that they will settle or separate significantly during storage.

The dry blended product will preferably be prepared at a central location or plant and shipped as a powder to the point of use. That is one of the distinct advantages of the invention in that shipment of large amounts of liquid, taking up both bulk and weight, are eliminated. Moreover, the shelf life of the dry mix is much longer than for liquid mixes.

In powdered form, the mixture will consist of between about 0.5 and 2.0% w., and preferably between about 0.8 and 1.8% w., stabilizer mixture. The carrageenan content will comprise about 40 to 60% by weight of the stabilizer mixture. The second stablizer component(s) will be present in amounts of between about 20 to 40% by weight and the CMC will also be present in amounts between about 20 to 30% by weight of the stabilizer package. As stated above, the preferred ratio of carrageenan to second stabilizer and CMC will be about 2:1 with the ratio of second stabilizer to CMC being about 1:1 for neutral and chocolate formulations. As previously stated, xanthan gum, or in the case of acidic fruit flavored formulations, combinations of xanthan gum and guar gum are the preferred second stabilizer components to mix with the carrageenan and CMC. When using combinations of both xanthan gum and guar gum, it is preferable to use about equal amounts of zanthan gum, guar gum and CMC.

The yogurt powder content of the dry blend will be between about 3 and 14% by weight. In the neutral and chocolate formulations, the yogurt powder will make up between about 3 to 10% by weight of the dry blend. In the acidic formulation, the range is somewhat broader and may vary between about 3 to 14% by weight. However, the preferred yogurt powder content in the acidic blend will generally be greater than in the neutral or chocolate formulations.

The milk solids, other than yogurt powder, will vary between about 1.5 to 40% by weight of the overall formulation. However, when broken down according to formulation type, the milk solid contents of the acidic formulation are quite different from the neutral and chocolate formulations. The neutral and chocolate formulation preferably contain between about 14 and 40% by weight of whey solids or non-fat dry milk solids or a mixture of the two. When a mixture is used, both the whey solids and non-fat dry milk contents may vary between about 7 to 20% by weight. On the other hand, the milk solids content of the acidic formulation is preferably made up of whey protein concentrate solids and is present in amounts of between about 1.5 and 7% by weight.

The dry blend will consist of between about 43 to 94% w. of the sweetening agent which is the major component.

When preparing blends of the neutral formulation, the sweetening agent content will vary between about 50 and 82% by weight. When using blends of sucrose and maltodextrins, the sucrose content may vary between about 26 and 48% by weight and the maltodextrin content may vary between about 24 and 44% by weight. When using corn syrup solids and maltodextrin, the corn syrup content may vary between about 33 and 65% by weight and the maltodextrin content may vary between about 17 and 33% by weight.

In blends of the chocolate formulation, the sweetening agent content will vary between about 43 and 78% by weight. When using blends of sucrose and maltodextrins, the sucrose content may vary between about 33 and 54% by weight and the maltodextrin content may vary between about 10 and 24% by weight. When using corn syrup solids and maltodextrin, the corn syrup content may vary between about 43 and 70% by weight and the maltodextrin content may vary between about 0 and 17% by weight.

When preparing blends of the acidic fruit flavored formulations, the sweetening agent content will vary between about 66 and 94% by weight. When using blends of sucrose and maltodextrin, the sucrose content may vary between about 33 and 54% by weight and the maltodextrin content may vary between about 33 and 47% by weight. When using corn syrup solids and maltodextrin, the corn syrup content may vary between about 43 and 77% by weight and the maltodextrin content may vary between about 23 and 37% by weight.

About 0.03 to 10.0% by weight of the dry blend will be flavoring agent. When natural flavoring agents such as chocolate or fruit powders are used, they will be present in amounts of between about 0.6 and 10.0%. For artificial flavoring agents, the range will generally vary between about 0.03 and 3.0% by weight.

In acidic formulations containing a fruit acid, from 0.03 up to about 1.5% w. of an acid such as citric acid, malic acid or tartaric acid may be added to the composition. In addition, from 0.03 up to about 0.5% by weight of the sodium salt of the acid can also be utilized for flavor balance and buffering.

As previously indicated, other ingredients such as added protein, vitamins and/or minerals and coloring aids, which are compatible and do not affect the properties of the frozen product, may also be utilized.

When ready for freezing, the dry blend is dissolved in an appropriate amount of cold water, preferably 50° F. or lower, to provide the desired solids content.

The aqueous solution containing the dissolved solids is then quickly frozen, while being agitated to incorporate air, to provide the desired soft frozen product having the desired overrun and draw temperature. With a proper liquid mixture and freezing conditions, the formation of ice crystal size is controlled to give the desired degree of smoothness in body and texture.

Overrun is defined as the volume of frozen product obtained in excess of the volume of the liquid mixture before freezing and is usually expressed in terms of "percent overrun." This increased volume is composed primarily of air incorporated during the freezing process. Generally speaking, the percent overrun is proportional to the solids content of the mixture, i.e. the higher the solids content the higher the percent overrun.

In the present invention, it has been found that the percent overrun will vary between about 35 to 65% at a draw temperature of between about 18°-23° F. The freezing time should be as fast as practical due to the fact that ice crystals formed quickly are smaller than those formed more slowly. It is therefore preferred to freeze and draw from the freezer in as short a time as possible to maintain the intergrity of the frozen product.

The function of the freezing process is to freeze a portion of the water of the mix and to incorporate air into the mix. The ice crystals formed are practically pure water in a solid form and thus the sugar, yogurt and other milk solids, stabilizers and flavoring agents become more concentrated in the remaining liquid water. Thus, the soft frozen product drawn from the freezer for service is a ternary mixture of ice crystals, air cells and unfrozen liquid containing sugars, milk solids, stabilizers and flavoring agents. Although the soft frozen product is a complicated mixture, it is believed that the air cells are dispersed in a continuous liquid phase with embedded ice crystals. The stabilizers combine with the liquid water and control ice crystal size and air cell uniformity thereby promoting the formation of a smooth, creamy textured product which is stable and which has a slow meltdown.

The following examples are illustrative of the invention. In these examples, ingredients are reported in terms of parts by weight (ppw). In the dry mixtures, the parts add up to a total of 100. Hence, the dry ingredients are also reported in percent by weight. One skilled in the art can easily prepare either large or small quantities using these parts or percentages.

EXAMPLE I

Neutral Formulation Mix

Into a ribbon blender was blended 1.38 ppw of a stabilizer consisting of 0.69 ppw carrageenan, 0.345 ppw xanthan gum, and 0.345 ppw CMC; 75.5 ppw of a sweetening agent consisting of 39.36 ppw sucrose and 36.24 ppw maltodextrin; 4.31 ppw of a dried yogurt powder; 18.55 ppw of milk solids made up of 5.18 ppw dried whey and 13.37 ppw non-fat dried milk solids; and 0.26 ppw of vanilla flavoring. The product was thoroughly blended until homogeneous. The dry blended product is ready for packaging and shipping.

EXAMPLE II

Neutral Formulation Frozen Yogurt

One part by weight of the dry blend from Example I was dissolved in 2.45 parts by weight of 42° F. water to form a liquid mix having a solids content of 28.98% w., i.e. 11.38% w. sucrose, 10.5% w. maltodextrin, 1.25% w. yogurt powder, 1.5% w. whey powder, 3.875% w. non-fat dry milk solids, 0.2% w. carrageenan, 0.1% xanthan gum, 0.1% w. CMC and 0.075% w. vanilla.

The mix was stirred until all the ingredients were in solution. The mix was then placed in a Mitsubishi freezer at a No. 4 setting and frozen to draw temperature of 19°-23° F. The soft frozen yogurt had an overrun of about 55%. The body and texture of the product was smooth and creamy.

EXAMPLE III

Chocolate Formulation Mix

Into a ribbon blender was blended 1.36 ppw of a stabililzer consisting of 0.68 ppw carrageenan, 0.34 ppw xanthan gum, and 0.34 ppw CMC; 60.96 ppw of a sweetening agent consisting of 44.03 ppw sucrose and 16.93 ppw maltodextrin; 4.23 ppw of a dried yogurt powder; 26.67 ppw of milk solids made up of 13.55 ppw dried whey and 13.12 ppw non-fat dried milk solids; and 6.78 ppw of unsweetened cocoa powder. The product was thoroughly blended until homogeneous. As in Example I, the dry blended product is ready for packaging and shipping.

EXAMPLE IV

Chocolate Formulation Frozen Yogurt

One part by weight of the dry blend from Example III was dissolved in 2.39 parts by weight of 42° F. water to form a liquid mix having a solids content of 29.54% w., i.e. 13.00% w. sucrose, 5.00% w. maltodextrin, 1.25% w. yogurt powder, 4.0% w. whey powder, 3.89% w. non-fat dry milk solids, 0.2% w. carrageenan, 0.1% w. xanthan gum, 0.1% w. CMC and 2.0% w. chocolate.

The mix was stirred until all the ingredients were in solution. The mix was then placed in a Mitsubishi freezer at a No. 4 setting and frozen to a draw temperature of 19° to 23° F. The soft frozen chocolate yogurt had an overrun of about 55%. The body and texture of this product was also smooth and creamy.

EXAMPLE V

Acidic Fruit Formulation Mix

Into a ribbon blender was blended 1.67 ppw of a stabilizer consisting of 0.67 ppw carrageenan, 0.33 ppw xanthan gum, 0.33 ppw of guar gum, 0.33 ppw CMC; 84.92 ppw of a sweetening agent consisting of 43.28 ppw sucrose and 41.63 ppw maltodextrin; 8.33 ppw of a dried yogurt powder; 4.16 ppw of milk solids in the form of whey protein concentrate; 0.67 ppw of citric acid, 0.17 ppw sodium citrate, 0.08 ppw of an natural peach flavor. The product was thoroughly blended until homogeneous. The dry blended product is ready for packaging and shipping.

EXAMPLE VI

Acidic Fruit Formulation Frozen Yogurt

One part by weight of the dry blend from Example V was dissolved in 2.34 parts by weight of 42° F. water to form a liquid mix having a solids content of 30.02% w., i.e. 13.00% w. sucrose, 12.5% w. maltodextrin, 2.50% w. yogurt powder, 1.25% w. whey protein concentrate, 0.2% w. carrageenan, 0.1% w. xanthan gum, 0.1% w.

guar gum, 0.1% CMC, 0.2% w. citric acid, 0.05% w. sodium citrate and 0.02% w. natural peach flavoring.

The mix was stirred until all the ingredients were in solution. The mix was then placed in a Mitsubishi freezer at a No. 4 setting and frozen to a draw temperature of 18° to 23° F. The soft frozen yogurt had an overrun of about 55%. As in previous examples, the body and texture of the product was smooth and creamy.

EXAMPLE VII

The following table contains a representative range of calculated, hypothetical mixtures with projected overrun, and texture data. The projected results can be realistically expected based on data already obtained.

| INGREDIENTS | \multicolumn{16}{c}{MIX NUMBER} |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 |
| \multicolumn{17}{c}{COMPOSITION IN PERCENT BY WEIGHT OF NEUTRAL FLAVOR SOFT FROZEN YOGURT MIXES OBTAINED BY COMBINING A PREMIX WITH COLD WATER AND FREEZING} |
| Carrageenan | .2 | .2 | .2 | .2 | .2 | .2 | .2 | .2 | .2 | .2 | .1 | .2 | .2 | .2 | .3 | .2 |
| Guar Gum |  |  |  |  | .1 |  |  |  | .1 |  | .1 |  |  |  |  |  |
| Xanthan Gum | .1 | .1 | .1 | .1 |  | .1 | .1 | .1 |  | .1 | .1 | .1 | .1 | .1 | .1 | .1 |
| CMC | .1 | .1 | .1 | .1 | .1 | .1 | .1 | .1 | .1 | .1 | .1 | .1 | .1 | .1 | .1 | .1 |
| Yogurt Powder | 1.25 | 1.25 | 1.25 | 1.25 | 1.25 | 1.5 | 1.25 | 1.25 | 1.00 | 1.25 | 1.25 | 1.25 | 1.25 | 2.0 | 3.0 | 1.25 |
| Non-Fat Milk Solids | 3.8 | 3.8 | 3.8 | 3.8 | 3.8 | 3.8 | 5.0 | 2.0 | 2.0 | 2.0 | 3.8 | 3.8 | 4.0 | 5.0 | 6.0 | 3.0 |
| Whey Powder | 1.50 | 1.5 | 1.5 | 1.5 | 1.5 | 1.5 | 1.5 | 1.5 | 1.0 | 1.0 | 1.5 | 1.50 | 1.5 | 3.0 | 3.0 | 1.5 |
| Sweetening Agent | 11.4 | 11.4 | 11.4 | 11.4 | 11.4 | 11.4 | 11.4 | 11.4 | 11.4 | 10 | 15 | 10 | 10 | 12 | 12.0 | 13.0 |
| Maltodextrin | 10.5 | 10.5 | 10.5 | 10.5 | 10.5 | 10.5 | 10.5 | 10.5 | 10.5 | 7 | 5 | 12 | 10 | 12 | 13.0 | 13.0 |
| Flavoring Agent | .075 | .06 | .12 | .25 | .25 | .12 | .25 | .06 | .06 | .25 | .12 | .06 | .06 | .25 | .25 | .25 |
| Total Solids | 28.925 | 28.91 | 28.97 | 29.10 | 29.10 | 29.22 | 30.30 | 27.11 | 26.36 | 21.9 | 27.07 | 29.01 | 27.21 | 34.65 | 37.75 | 32.25 |
| Water | 71.075 | 71.09 | 71.03 | 70.9 | 70.9 | 70.78 | 69.70 | 72.89 | 73.64 | 78.1 | 72.93 | 70.99 | 72.79 | 65.35 | 62.25 | 67.75 |
| Draw Temp. °F. | 22 | 21 | 20 | 19 | 20 | 22 | 23 | 20 | 18 | 21 | 22 | 20 | 23 | 22 | 23 | 22 |
| % overrun | 55 | 52 | 56 | 51 | 50 | 54 | 60 | 48 | 45 | 40 | 52 | 54 | 65 | 60 | 58 | 65 |
| \multicolumn{17}{c}{COMPOSITION IN PERCENT BY WEIGHT OF ACID FRUIT FLAVOR SOFT FROZEN YOGURT MIXES OBTAINED BY COMBINING A PREMIX WITH COLD WATER AND FREEZING} |
| Carrageenan | .2 | .2 | .2 | .2 | .2 | .2 | .1 | .2 | .2 | .2 | .2 |  | .2 | .2 | .2 | .2 |
| Guar Gum |  |  |  |  |  | .1 | .2 |  |  |  |  | .2 |  |  |  |  |
| Xanthan Gum | .1 | .1 | .1 | .1 | .1 | .1 | .1 | .1 | .1 | .1 | .1 | .1 | .1 | .1 | .1 | .1 |
| CMC | .1 | .1 | .1 | .1 | .1 | .1 | .1 | .1 | .1 | .1 | .1 | .1 | .1 | .1 | .1 | .1 |
| Yoghurt Powder | 2.5 | 2.5 | 2.5 | 2.5 | 2.5 | 2.5 | 2.5 | 1.5 | 1.5 | 4.0 | 2.5 | 2.5 | 2.5 | 2.5 | 2.5 | 2.5 |
| Whey Protein Conc. | 1.25 | 1.25 | 1.25 | 1.25 | 1.25 | 1.25 | 1.25 | 1.25 | 1.0 | 2.0 | 2.0 | 1.25 | 1.25 | 1.25 | 1.25 | .5 |
| Sweetening Agent | 13.00 | 13.00 | 13.00 | 13.00 | 13.00 | 13.00 | 13.00 | 13.00 | 10.00 | 15 | 13 | 13.00 | 13.00 | 13.00 | 13.00 | 13.00 |
| Maltodextrin | 12.50 | 12.5 | 12.5 | 12.5 | 12.5 | 12.5 | 12.5 | 12.5 | 9.00 | 14 | 13 | 12.5 | 12.5 | 12.5 | 12.5 | 12.5 |
| Flavoring Agent | .02 | .05 | .075 | .19 | .4 | .05 | .05 | .05 | .05 | .05 | .05 | .19 | .19 | .05 | .05 | .05 |
| Citric Acid | .2 | .2 | .2 | .2 | .2 | .2 | .2 | .2 | .2 | .2 | .2 | .1 | .2 | .4 | .4 | .4 |
| Sodium Citrate | .05 | .05 | .05 | .05 | .05 | .05 | .05 | .05 | .05 | .05 | .05 | .05 | 0 | 0 | .1 | .1 |
| Total Solids | 29.92 | 29.95 | 29.975 | 30.09 | 30.3 | 30.05 | 30.05 | 28.95 | 22.2 | 35.7 | 31.2 | 29.99 | 30.04 | 30.1 | 30.2 | 29.45 |
| Water | 70.08 | 70.05 | 70.025 | 69.91 | 69.7 | 69.95 | 69.95 | 71.05 | 77.8 | 64.3 | 68.8 | 70.01 | 69.96 | 69.9 | 69.8 | 70.55 |
| Draw Temp. °F. | 19 | 20 | 18 | 21 | 22 | 21 | 20 | 23 | 18 | 21 | 20 | 22 | 23 | 19 | 22 | 21 |
| % overrun | 61 | 63 | 62 | 60 | 64 | 59 | 58 | 61 | 40 | 48 | 60 | 59 | 56 | 57 | 58 | 52 |
| \multicolumn{17}{c}{COMPOSITION IN PERCENT BY WEIGHT OF CHOCOLATE FLAVOR SOFT FROZEN YOGURT MIXES OBTAINED BY COMBINING A PREMIX WITH COLD WATER AND FREEZING} |
| Carrageenan | .2 | .2 | .2 | .2 | .2 | .2 | .2 | .2 | .3 | .2 | .2 | .2 | .2 |  | .1 | .1 |
| Guar Gum |  |  |  | .1 | .1 |  |  |  | .1 |  |  |  | .1 | .1 | .1 | .2 |
| Xanthan Gum | .1 | .1 | .1 |  | .1 | .1 | .1 | .1 | .2 | .1 | .1 |  |  | .2 | .2 | .1 |
| CMC | .1 | .1 | .1 | .1 | .2 | .1 | .1 | .1 | .1 | .1 | .1 | .1 | .1 | .1 |  |  |
| Yoghurt Powder | 1.5 | 1.5 | 1.5 | 1.5 | 1.5 | 1.5 | 1.5 | 1.0 | 1.5 | 1.5 | 1.5 | 1.5 | 1.5 | 1.5 | 1.5 | 1.5 |
| Non-Fat Milk Solids | 3.9 | 3.9 | 3.9 | 3.9 | 3.9 | 8.0 | 8.0 | 2.0 | 2.0 | 3.0 | 3.0 | 3.0 | 3.0 | 3.0 | 3.0 | 3.0 |
| Whey Powder | 4.0 | 4.0 | 4.0 | 4.0 | 4.0 | 8.0 | 8.0 | 2.0 | 2.0 | 2.0 | 4.0 | 4.0 | 4.0 | 4.0 | 4.0 | 4.0 |
| Sweetening Agent | 13.0 | 15.0 | 11.0 | 13.0 | 13.0 | 13.0 | 13.0 | 10.0 | 13.0 | 13.0 | 13.0 | 13.0 | 13.0 | 13.0 | 13.0 | 13.0 |
| Maltodextrin | 5.0 | 3.0 | 7.0 | 5.0 | 5.0 | 5.0 | 7.0 | 4.0 | 5.0 | 5.0 | 5.0 | 5.0 | 5.0 | 5.0 | 5.0 | 5.0 |
| Flavoring Agent | 2.0 | 2.0 | 2.0 | 2.0 | 2.0 | 2.0 | 2.0 | 1.5 | 2.0 | 2.0 | 3.0 | 4.0 | 1.0 | 2.0 | 2.0 | 2.0 |
| Total Solids | 29.80 | 29.80 | 29.8 | 29.8 | 30.0 | 37.9 | 39.9 | 20.9 | 26.0 | 27.1 | 30 | 30.9 | 27.9 | 28.9 | 28.9 | 28.9 |
| Water | 70.2 | 70.2 | 70.2 | 70.2 | 70.0 | 62.1 | 60.1 | 79.1 | 74.0 | 72.9 | 70 | 69.1 | 72.1 | 71.1 | 71.1 | 71.1 |
| Draw Temp °F. | 21 | 20 | 22 | 23 | 22 | 22 | 21 | 19 | 20 | 19 | 22 | 21 | 22 | 21 | 22 | 20 |
| % Overrun | 60 | 63 | 61 | 64 | 60 | 50 | 45 | 41 | 50 | 54 | 57 | 58 | 55 | 60 | 59 | 61 |

While the above examples and description present the best presently known modes of utilizing the invention, it will become apparent to one skilled in the art that other ingredient combinations and variations in mixing and processing, not specifically disclosed, will also fall within the scope of the invention which is to be limited only by the scope of the appended claims.

We claim:

1. A smooth textured soft frozen non-fat yogurt having a solids content between about 18 to 43% w. and an overrun of between about 35-65% comprising:
   (a) 0.2 to 0.6% w of a stabilizing mixture consisting of 40-60% w. cagarreenan, 20-40% w. of second stabilizer selected from the group consisting of xanthan gum, guar gum, locust bean gum, sodium alginate, gelatin, gum tragacanth, India gum, agar-agar and pectin and mixtures thereof and 20-30% w. CMC;
   (b) 1-4% w. of a dried yogurt powder,
   (c) 0.5-12% w. of added milk solids selected from the group consisting of non-fat dry milk solids, whey solids and whey protein concentrate;
   (d) 13-30% w. of a sweetening agent;
   (e) 0.01 to 3% w. of a flavoring agent;
   (f) 0.0 to 0.5% w. of an acidifying agent; and
   (g) 0.0 to 0.15% w. of the sodium salt of an acidifying agent;
   (h) water to 100%.

2. A soft frozen non-fat yogurt according to claim 1 wherein the second stabilizer is a member selected from the group consisting of xanthan gum, guar gum and locust bean gum and mixtures thereof.

3. A soft frozen non-fat yogurt according to claim 2 wherein the sweetening agent is a member selected from the group consisting of sucrose, fructose and corn syrup solids admixed with maltodextrins.

4. A soft frozen non-fat yogurt according to claim 3 having a neutral flavor formulation wherein (a) the yogurt powder is present in amounts ranging between about 1 and 3% w., (b) the milk solids are present in amounts of between about 4 and 12% w., (3) the sweetening agent is present in amounts ranging from about 13 to 27% w.

5. A soft frozen non-fat yogurt according to claim 4 wherein the milk solids are members selected from the group consisting of non-fat dry milk solids and whey solids.

6. A soft frozen non-fat yogurt according to claim 5 wherein the non-fat milk solids and whey solids are each present in amounts ranging between about 2 to 6% w.

7. A soft frozen non-fat yogurt according to claim 6 wherein the sweetening agent is a combination of sucrose and maltodextrins and wherein the sucrose is present in amounts ranging between about 8 and 14% w. and the maltodextrins are present in amounts ranging between about 7 and 13% w.

8. A soft frozen non-fat yogurt according to claim 7 wherein the second stabilizer is xanthan gum.

9. A soft frozen non-fat yogurt according to claim 3 having a chocolate flavor formulation wherein (a) the yogurt powder is present in amounts ranging between about 1 and 3% w., (b) the milk solids are present in amounts of between about 4 and 12% w., (3) the sweetening agent is present in amounts ranging from about 13 to 23% w.

10. A soft frozen non-fat yogurt according to claim 9 wherein the milk solids are members selected from the group consisting of non-fat dry milk solids and whey solids.

11. A soft frozen non-fat yogurt according to claim 10 wherein the non-fat milk solids and whey solids are each present in amounts ranging between about 2 to 6% w.

12. A soft frozen non-fat yogurt according to claim 11 wherein the sweetening agent is a combination of sucrose and maltodextrins and wherein the sucrose is present in amounts ranging between 10 and 16% w. and the maltodoxtrins are present in amounts ranging between about 3 and 7% w. and wherein the flavoring is present in amounts ranging between about 0.2 and 3.0% w.

13. A soft frozen non-fat yogurt according to claim 12 wherein the second stabilizer is xanthan gum.

14. A soft frozen non-fat yogurt according to claim 3 having an acidic fruit flavor formulation wherein (a) the yogurt powder is present in amounts ranging between about 2 to 4% w., (b) the milk solids are present in amounts of between about 0.5 and 2% w., (3) the sweetening agent is present in amounts ranging from about 20 to 28% w. the acidifying agent is present in amounts ranging between about 0.1 and 0.5% w. and the sodium salt of an acidifying agent is present in amounts ranging between about 0.01 and 0.15% w.

15. A soft frozen non-fat yogurt according to claim 14 wherein the milk solids are whey protein concentrates.

16. A soft frozen non-fat yogurt according to claim 15 wherein the sweetening agent is a combination of sucrose and maltodextrins and wherein the sucrose is present in amounts ranging between about 10 and 16% w. and the maltodextrins are present in amounts ranging between about 10 and 14% w.

17. A soft frozen non-fat yogurt according to claim 16 wherein the second stabilizer is a mixture of xanthan gum and guar gum.

18. A soft frozen non-fat yogurt according to claim 3 wherein the sweetening agent is a member selected from the group consisting of sucrose, fructose and corn syrup solids admixed with maltodextrins and added protein selected from the group consisting of soy protein isolate and whey protein concentrate having a protein content of between about 75 and 92% by weight and wherein the weight ratio of protein to maltodextrin is between about 1:99 to 1:1.5.

19. A dry, particulate, homogeneous mixture for the production of flavored non-fat soft frozen yogurt consisting of:
(a) 0.5 to 2.0% w. of a stabilizing mixture consisting of 40–60% w. carrageenan, 20–40% w. of second stabilizer selected from the group consisting of xanthan gum, guar gum, locust bean gum, sodium alginate, gelatin, gum tragacanth, India gum, agar-agar and pectin and mixtures thereof and 20–30% w. CMC;
(b) 3–14% w. of a dried yogurt powder,
(c) 1.5–40% w. of added milk solids selected from the group consisting of non-fat dry milk solids, whey solids and whey protein concentrate;
(d) 43–94% w. of a sweetening agent;
(e) 0.03 to 10% w. of a flavoring agent;
(f) 0.0 to 1.5% w. of an acidifying agent; and
(g) 0.0 to 0.5% w. of the sodium salt of an acidifying agent.

20. A dry, particulate, homogeneous mixture according to claim 19 wherein the second stabilizer is a member selected from the group consisting of xanthan gum, guar gum and locust bean gum and mixtures thereof.

21. A dry, particulate, homogeneous mixture according to claim 20 wherein the sweetening agent is a member selected from the group consisting of sucrose, fructose and corn syrup solids admixed with maltodextrins.

22. A dry, particulate, homogeneous mixture according to claim 21 having a neutral flavor formulation wherein (a) the yogurt powder is present in amounts ranging between about 3 and 10% w., (b) the milk solids are present in amounts of between about 14 and 40% w., (c) the sweetening agent is present in amounts ranging from about 50 to 82% w.

23. A dry, particulate, homogeneous mixture according to claim 22 wherein the milk solids are members selected from the group consisting of non-fat dry milk solids and whey solids.

24. A dry, particulate, homogeneous mixture according to claim 23 wherein the non-fat milk solids and whey solids are each present in amounts ranging between about 7 to 20% w.

25. A dry, particulate, homogeneous mixture according to claim 24 wherein the sweetening agent is a combination of sucrose and maltodextrins and wherein the sucrose is present in amounts ranging between about 26 and 48% w. and the maltodextrins are present in amounts ranging between about 24 and 44% w.

26. A dry, particulate, homogeneous mixture according to claim 25 wherein the second stabilizer is xanthan gum.

27. A dry, particulate, homogeneous mixture according to claim 21 having a chocolate flavor formulation wherein (a) the yogurt powder is present in amounts ranging between about 3 and 10% w., (b) the milk solids are present in amounts of between about 14 and 40% w., (3) the sweetening agent is present in amounts ranging from about 43 to 78% w.

28. A dry, particulate, homogeneous mixture according to claim 27 wherein the milk solids are members selected from the group consisting of non-fat dry milk solids and whey solids.

29. A dry, particulate, homogeneous mixture according to claim 28 wherein the non-fat milk solids and whey solids are each present in amounts ranging between about 7 to 20% w.

30. A dry, particulate, homogeneous mixture according to claim 29 wherein the sweetening agent is a combination of sucrose and maltodextrins and wherein the sucrose is present in amounts ranging between about 33 and 54% w. and the maltodextrins are present in amounts ranging between about 10 and 24% w. and wherein the flavoring is present in amounts ranging between about 0.6 and 10.0% w.

31. A dry, particulate, homogeneous mixture according to claim 30 wherein the second stabilizer is xanthan gum.

32. A dry, particulate, homogeneous mixture according to claim 31 having an acidic fruit flavor formulation wherein (a) the yogurt powder is present in amounts ranging between about 3 to 14% w, (b) the milk solids are present in amounts of between about 1.5 and 7% w., (c) the sweetening agent is present in amounts ranging from about 66 to 94% w., the acidifying agent is present in amounts ranging between about 0.3 and 1.5% w. and the sodium salt of an acidifying agent is present in amounts ranging between about 0.03 and 0.5% w.

33. A dry, particulate, homogeneous mixture according to claim 32 wherein the milk solids are whey protein concentrates.

34. A dry, particulate, homogeneous mixture according to claim 32 wherein the sweetening agent is a combination of sucrose and maltodextrins and wherein the sucrose is present in amounts ranging between about 33 and 54% w. and the maltodextrins are present in amounts ranging between about 33 and 47% w.

35. A dry, particulate, homogeneous mixture according to claim 33 wherein the second stabilizer is a mixture of xanthan gum and guar gum.

36. A dry, particulate, homogeneous mixture according to claim 21 wherein the sweetening agent is a member selected from the group consisting of sucrose, fructose and corn syrup solids admixed with maltodextrins and added protein selected from the group consisting of soy protein isolate and whey protein concentrate having a protein content of between about 75 and 92% by weight and wherein the weight ratio of protein to maltodextrin is between about 1:99 to 1:1.5.

* * * * *